Jan. 15, 1924.

C. D. ENOCHS 1,480,856

GEAR TRANSMISSION MECHANISM

Original Filed June 15, 1921    4 Sheets-Sheet 2

INVENTOR.
Claude Enochs

Jan. 15, 1924.

C. D. ENOCHS 1,480,856

GEAR TRANSMISSION MECHANISM

Original Filed June 15, 1921    4 Sheets-Sheet 4

INVENTOR
Claude D Enochs

Patented Jan. 15, 1924.

1,480,856

UNITED STATES PATENT OFFICE.

CLAUDE D. ENOCHS, OF MINNEAPOLIS, MINNESOTA.

GEAR TRANSMISSION MECHANISM.

Original application filed June 15, 1921, Serial No. 477,706. Divided and this application filed February 26, 1923. Serial No. 621,293.

*To all whom it may concern:*

Be it known that I, CLAUDE D. ENOCHS, a citizen of the United States, and a resident of Minneapolis, in the county of Hennepin and State of Minnesota, have invented certain new and useful Improvements in a Gear Transmission Mechanism, of which the following is a specification.

One object of my invention is to provide an improved transmission especially adapted for a two-wheel or unstable type of tractor.

Another object is to provide improved means for transmitting the power from the engine to the drive wheels, particularly with reference to ease of manufacture and assembly of the complete machine.

With these and incidental objects in view, the invention consists of certain novel features of construction and combination of parts, the essential features of which are hereinafter described with reference to the drawings which accompany and form a part of this specification.

Figure 1:
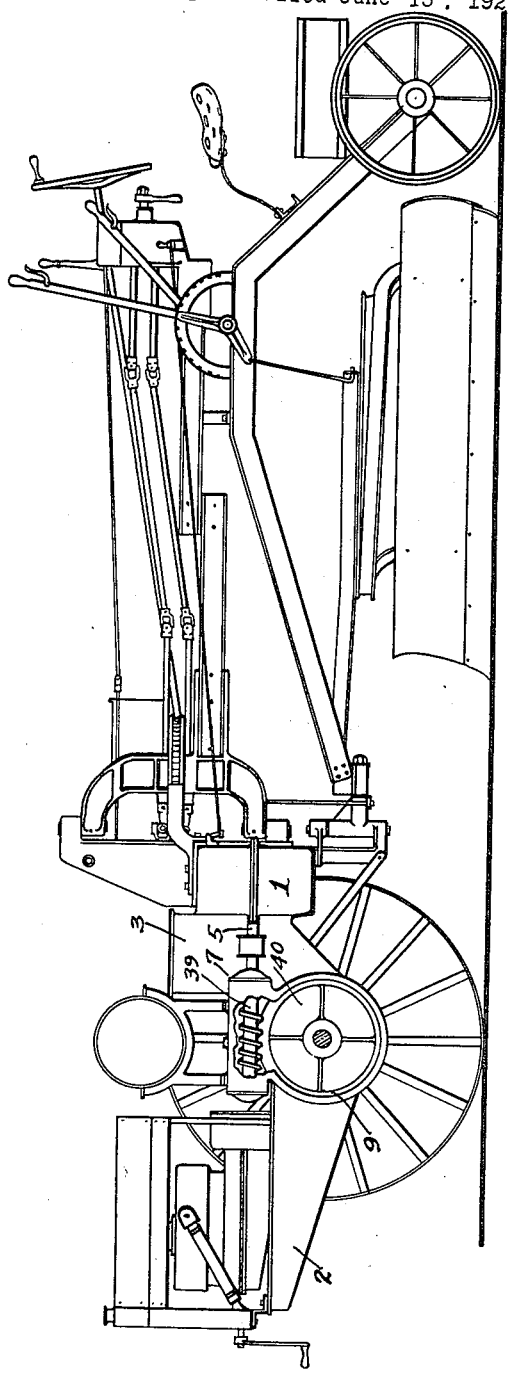
Figure 2:
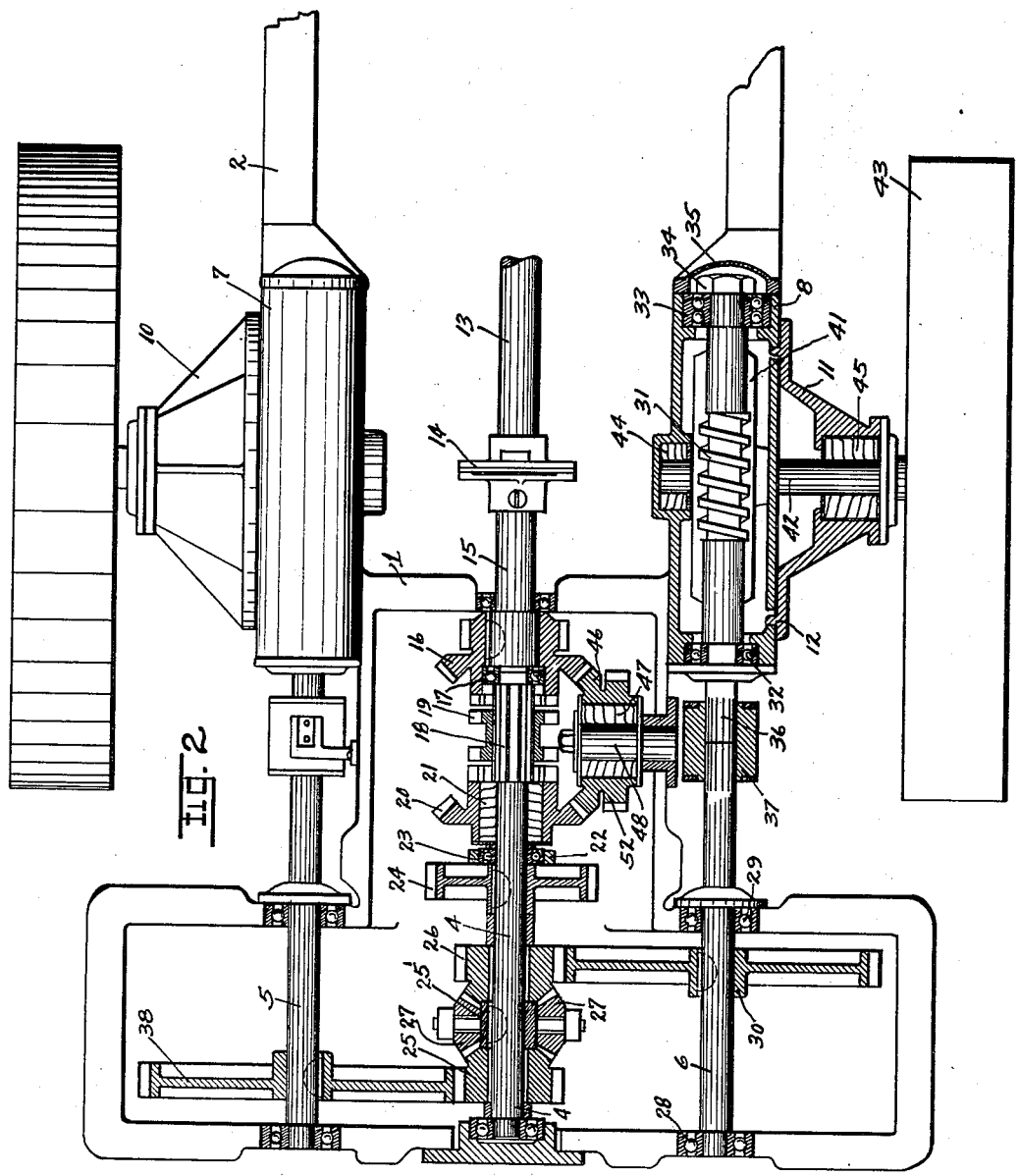
Figure 3:
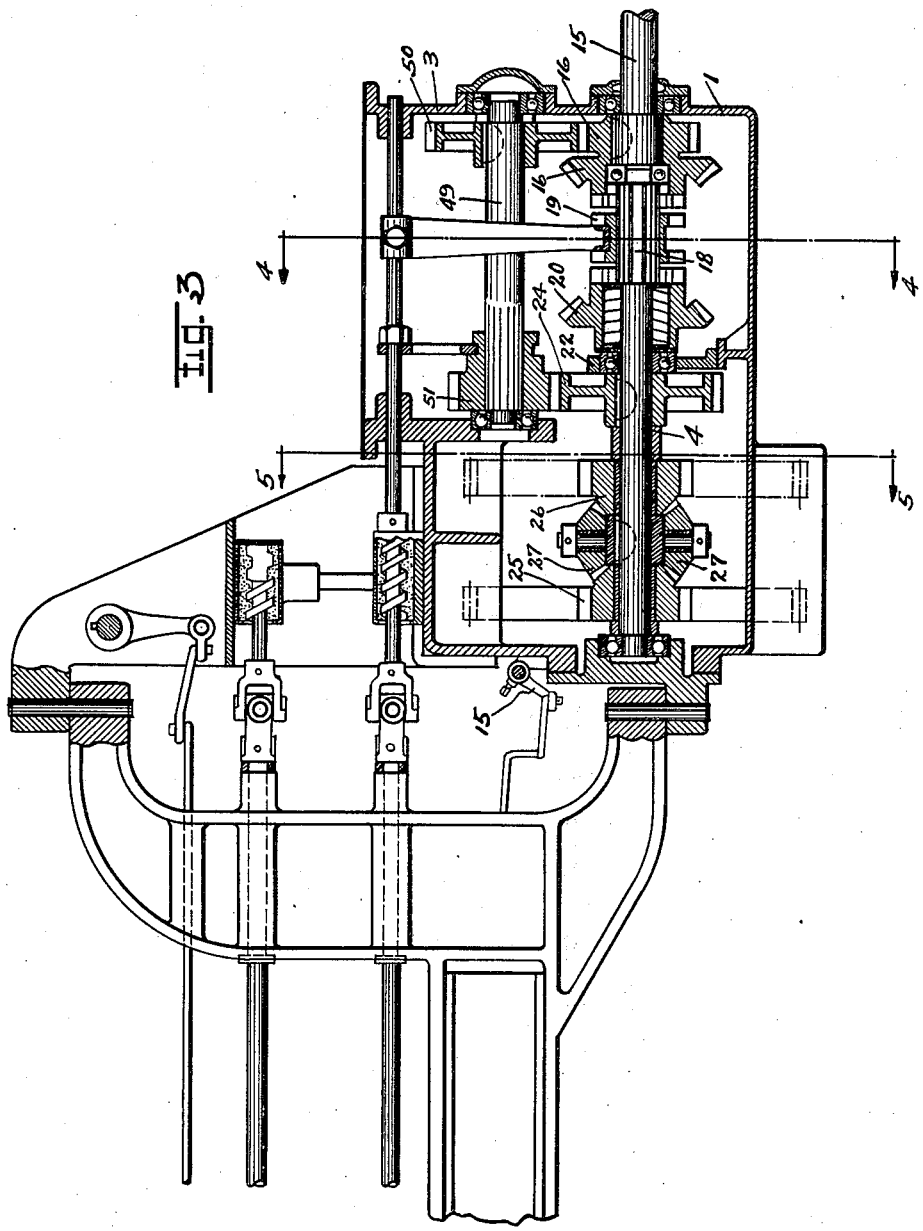
Figure 4:
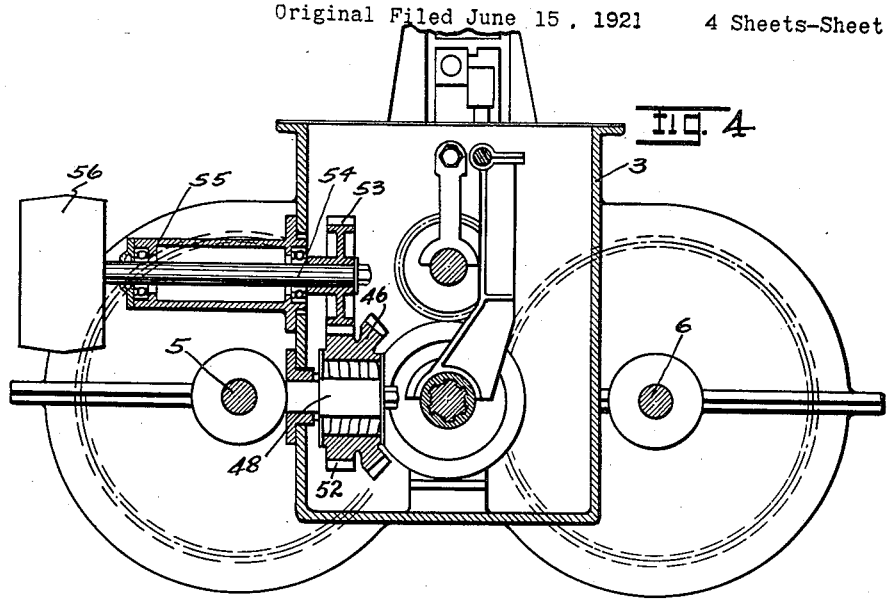
Figure 5:
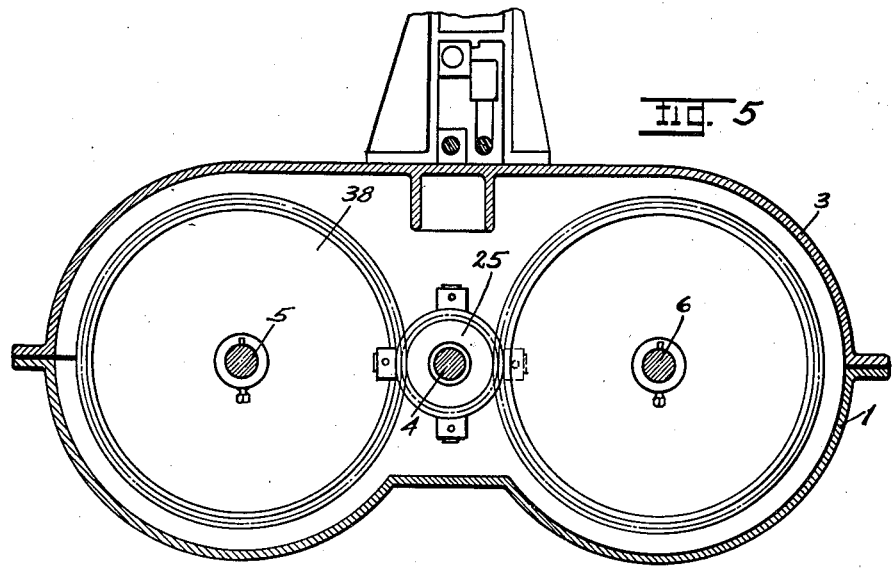

In the drawings Figure 1 is a side elevation of a power grader embodying my invention, with parts removed to better show the construction; Figure 2 is a plan view of the transmission; Figure 3 is a vertical longitudinal section taken through the center of the transmission; Figure 4 is a section taken on the line 4—4, Figure 3; and Figure 5 is a section taken on the line 5—5, Figure 3.

This is a divisional case of application No. 477,706, filed by me June 15, 1921, for power grader, and as this invention has only to do with the gear transmission mechanism and mechanism pertaining thereto, no general description of the machine as a whole will be given beyond the reference to the parent application.

As shown particularly in Figures 1, 2, and 3, the transmission housing consists of the gear case 1 which is a unit casting and has a front extension in the form of an engine mounting yoke 2 cast integral therewith, and gear housing 3, the latter serving as a gear cover and the transmission spur and bevel gears are all enclosed within this gear case and housing in an oil tight manner, the gears running in a bath of oil.

The split between the gear case and the housing is on the center line of the differential shaft 4 and the worm drive shafts 5 and 6, half of the bore for the bearings in which these shafts are mounted being in the gear case and half in the gear housing.

Forming an integral part of the gear case are two worm housings 7 and 8, which are closed above but which open below into worm gear housings 9, Figure 1.

The worm gear housings are closed on the sides by the drive shaft housings 10 and 11 which dowel into the gear housings at 12 and are also bolted thereto.

Suitable oil rings and caps are provided for all shafts so that not only the spur and bevel gears in the main transmission case are enclosed and run in oil but also the worm gears and worms are enclosed and run in an oil bath and anti-friction bearings are supplied for all shafts.

The engine is suitably mounted on the extension 2 and through the ordinary clutch the power is transmitted rearwardly through the clutch shaft 13, Figure 2, a flexible coupling 14 to the main drive shaft 15 which is in line with the differential shaft 4.

The construction of the gear case and housing as shown is such that the machining of the castings is a simple operation as the faces of the housings and gear case are each in one plane and when the faces are milled off the two main faces are bolted together and the assembled housing bored for the various shaft mountings.

From the construction as described it will be noted that the transmission assembly is a very simple matter as the main transmission units can be assembled on a bench then laid in the gear case and the housing placed thereover and bolted thereto so the assembly is an ideal job for production work.

Keyed or splined to the shaft 15, Figure 2, is a combination spur and bevel gear 16 which carries a pilot bearing 17. Supported by this pilot bearing is the forward end of the differential shaft 4 which is splined at 18 to carry the sliding jaw clutch 19.

The bevel gear 20 is mounted on the shaft 4 by a roller bearing 21 and just back of this gear the ball bearing holder 22 carries a ball bearing 23 to support the shaft 4.

Keyed or splined to the shaft 4 is a spur gear 24 and the spider 25' is likewise keyed or splined to the shaft 4.

The combination differential, bevel, and spur gears 25 and 26 are journalled on the shaft 4 and driven by the spider 25' through the customary bevel pinions 27 in the ordinary differential manner.

The worm drive shaft 6 is supported by bearings 28 and 29 and has keyed or splined thereto the spur gear 30 driven by the spur of the differential gear 26. The worm 31 is mounted on the one end by the bearing 32 and on the other end by the double row bearing 33 to which the worm is locked by the nut 34 and when the cap 35 is bolted to the worm housing 8 the end thrust of the worm in either direction is carried by the double row bearing 33. The other end of the worm is splined at 36 in the same manner as the front end of the worm drive shaft 6 and a drum 37 is splined to engage with and unite the worm drive shaft 6 with the worm 31.

The worm drive shaft 5 likewise carries spur gear 38 and drives a similar worm 39, Figure 1, in the same manner which has just been described for the worm drive shaft 6.

The worm 39 drives the worm gear 40 and similarly the worm 31 drives the worm gear 41, Figure 2.

The worm gears are splined to the drive shafts 42 which are keyed or otherwise suitably fastened to the drive wheels 43 and these drive shafts are supported by roller bearings 44 and 45.

The combination spur bevel idler gear 46 is mounted by the roller bearing 47 on the stub shaft 48 which is rigidly mounted in the gear case.

The jack shaft 49, Figure 3, is mounted by ball bearings in the gear housing and has keyed thereto the gear 50 which meshes with the spur of the gear 16 and has splined thereto the gear 51 which co-acts with the spur gear 24.

It is apparent from the foregoing description that if the jaw clutch 19 is engaged with the jaw clutch of gear 16 the differential spider will be driven in the same direction as the engine rotates whereas if the jaw clutch is engaged with the jaw of the gear 20 the spider will rotate in the direction opposite to that of the engine shaft. This provides the direct drive and the reverse for the ordinary working of the machine, while the jack shaft provides the emergency low gear.

When the jaw clutch 19 is in its neutral position and the gears 51 and 24 are in mesh the differential spider is driven in the same direction as the engine shaft, but at a low speed so as to provide greater torque for abnormal conditions.

The spur portion 52 of the gear 46 drives the gear 53, keyed or otherwise suitably fastened to the pulley shaft 54, carried by the housing 55 in suitable ball bearings and the power pulley 56 is likewise keyed or otherwise suitably fastened to the shaft 54.

While I have described my invention and illustrated it in one particular design, I do not wish it understood that I limit myself to this construction, as it is evident that the application of the invention may be varied in many ways within the scope of the following claims.

Claims:

1. A power plant transmission comprising in combination a gear case having the upper face thereof in one plane, a forwardly extending engine mounting yoke forming an integral part of said gear case, a main drive shaft, a differential shaft and two worm shafts horizontally mounted in one plane in said gear case, two worm and worm gear casings formed integral with said gear case, the worm case portions thereof having their axes lying in the plane of the face of said gear case, a gear housing having its lower face in one plane and forming a cover for said gear case, gears associated with said shafts for transmitting power from said main shaft to said worm shafts, worms driven by said worm shafts and mounted in said worm housings, worm gears driven by said worms and mounted in said worm gear housing, and drive wheel shafts driven by said worm gears.

2. In a power transmission the combination with a gear case of a main shaft, a differential shaft and two worm drive shafts mounted in one plane, a combination spur bevel gear driven by said main shaft and carrying a pilot bearing for the forward end of said differential shaft, a jaw clutch slidably splined on said differential shaft, a bevel gear journalled on said differential shaft, an idler bevel gear meshing between said last named gear and said first named gear, jaw clutch members on said differential shaft bevel gear and said main shaft gear for co-operation with said sliding jaw clutch, a differential spider and pinions driven by said differential shaft, differential gears driven by said spider and including spur gear faces, a spur gear driven by each of said differential spur gear faces and driving said worm shafts; a worm co-axial with each of said worm drive shafts, a worm gear driven by each of said worms and a drive shaft driven by each of said worm gears.

3. In a gear transmission the combination with a unit cast gear case having an engine yoke extending forward therefrom and forming an integral part thereof, power means supported by said yoke, a differential shaft driven by said power means, two worms positioned one on each side of said differential shaft and in the same plane therewith, means including differential means whereby said differential shaft drives said worms, a worm gear driven by each of said worms, all of said gears being carried in said unit casting, a drive shaft driven by each of said worm gears, a drive shaft housing for each of said drive shafts bolted to said unit casting, and a cover for said gearing.

4. In a power transmission the combination of a gear case, a forwardly extending engine support integral therewith, an engine mounted on said forward support, a clutch housing carrying a clutch for said engine, a rearwardly extending clutch shaft, a main drive shaft co-axial therewith, a differential shaft, two worm drive shafts, all having their axes in the same plane as said clutch shaft and in the plane of the upper face of said gear case, a gear housing for covering said gear case, and gearing co-acting with said shafts for transmitting power from said engine to said worm drive shafts.

CLAUDE D. ENOCHS.